United States Patent [19]

Touchstone

[11] 3,902,577

[45] Sept. 2, 1975

[54] BRAKE ADJUSTER FOR LOCOMOTIVE FOUR WHEEL TRUCK AND SINGLE BRAKE SHOE

[76] Inventor: Roy H. Touchstone, P.O. Box 2003, Jackson, Tenn. 38301

[22] Filed: Apr. 18, 1974

[21] Appl. No.: 461,960

[52] U.S. Cl................................ 188/197; 188/197
[51] Int. Cl.² .......................................... F16D 65/44
[58] Field of Search.......... 74/522; 188/196 M, 197

[56] References Cited
UNITED STATES PATENTS

| 935,176 | 9/1909 | Thompson | 188/197 |
| 1,652,677 | 12/1927 | McCoy et al. | 188/197 X |
| 3,024,871 | 3/1962 | Stein | 188/32 |
| 3,752,269 | 8/1973 | Touchstone | 188/197 |

Primary Examiner—Duane A. Reger

[57] ABSTRACT

A brake adjustment device particularly designed and constructed for use with four wheel, single brake shoe locomotive trucks, and including an apertured slide rod secured to the brake lever of a locomotive wheel and extending through a complementary apertures sleeve or outer housing secured to the brake lever of an adjacent or in line locomotive wheel whereby the adjuster may be utilized in much the same manner as a turnbuckle for quickly adjusting the brakes, or facilitating repair or replacement of worn brake shoes. Keeper pin means cooperates with the apertures of the complementary slide rod and outer housing for selectively securing the elements in the desired longitudinal relationship, and lever means cooperates with the keeper pin means for precluding accidental dislodging thereof.

6 Claims, 10 Drawing Figures

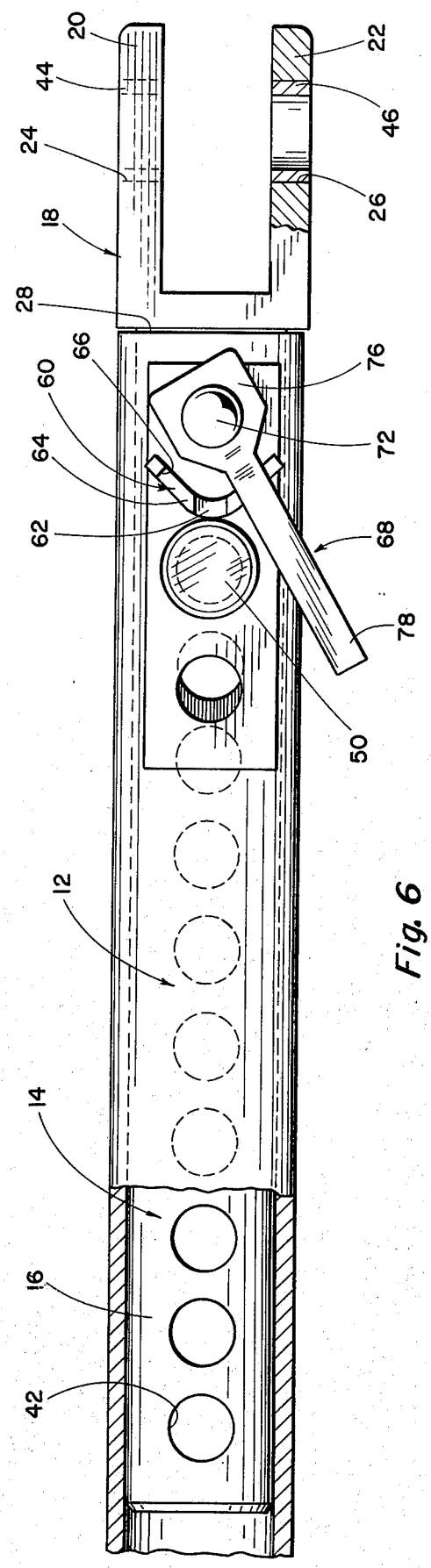
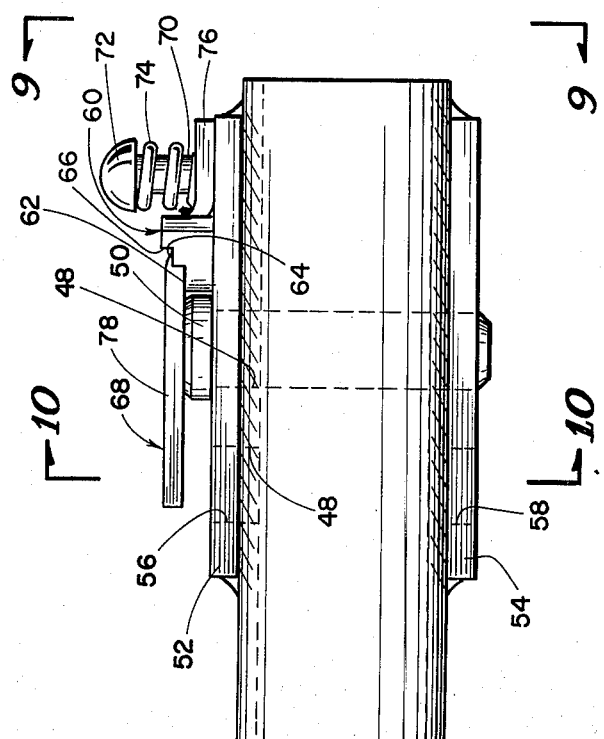
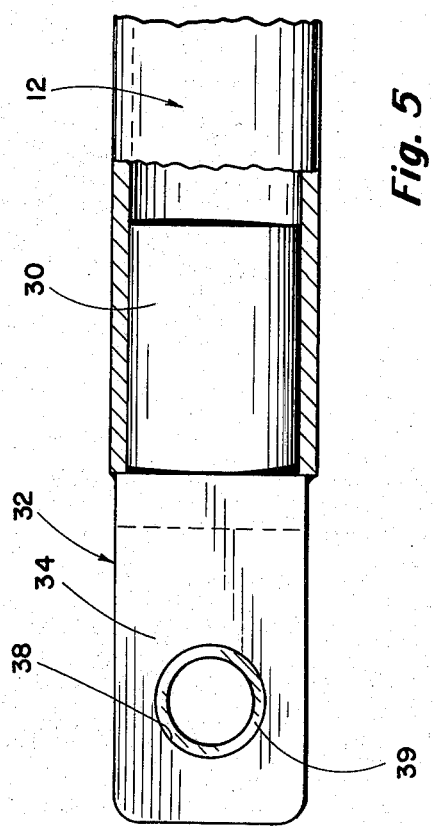

BRAKE ADJUSTER FOR LOCOMOTIVE FOUR WHEEL TRUCK AND SINGLE BRAKE SHOE

CROSS-REFERENCE TO RELATED APPLICATION

This application is related to my co-pending application Ser. No. 309,663, filed Nov. 27, 1972, and entitled "Quick Slack Adjuster for Locomotive Brakes", said entitled application having been allowed on Nov. 12, 1973, but not issued.

BACKGROUND OF THE INVENTION

1. Field of the Invention

This invention relates to improvements in brake adjustment devices for locomotives and more particularly, but not by way of limitation, to a quick adjuster device for the brakes of a four wheel, single brake shoe locomotive truck.

2. Description of the Prior Art

Locomotives, and particularly diesel locomotives, are normally provided with friction type brake shoes engagable with the outer periphery of the locomotive wheels for slowing or braking the speed thereof. The brake shoes wear out relatively rapidly and it becomes necessary to adjust the slack due to the wear thereof in order to maintain an efficient braking operation. Screw type slack adjusters are in widespread use today for adjusting the locomotive brakes. However, these devices are not only expensive, but also require a great amount of time for adjusting the slack in the brake system, and are particularly time consuming when it is necessary to replace worn brake shoes. For example, it requires approximately thirty minutes to 1 hour to screw the adjustments device out and screw it back in. This is a great disadvantage, particularly when it is considered that it is usually necessary to renew brake shoes relatively frequently. In addition, the screw type adjustment devices require lubricating or gearing about once a month, which is an added expense and a time consuming matter.

In an effort to overcome the disadvantages of the screw type adjusting devices, sliding type adjusters have been developed as shown in my prior U.S. Pat. No. 3,613,840, issued Oct. 19, 1971, and entitled "Quick Slack Adjuster for Locomotive Brakes" and No. 3,752,269 issued Aug. 14, 1972, and entitled "Quick Slack Adjuster for Locomotive Brakes", and my aforementioned co-pending application. These devices have been very successful, but it has been found that these structures are not readily useable in connection with locomotive four wheel trucks having single brake shoes.

The locomotive four wheel trucks normally comprise two independent pairs of axially aligned wheels, with each pair of axially aligned wheels being longitudinally aligned in a manner for following one another along a train track, or the like, as is well known. In the single brake shoe type four wheel truck, each wheel is usually provided with a single brake shoe engageable with the outer periphery thereof for providing the braking action therefor. Each of the wheels is normally provided with a brake lever interposed between the adjacent longitudinally aligned wheel, and the brake levers of the adjacent longitudinally aligned wheels are interconnected in a manner whereby the brake levers may be selectively repositioned. These brake levers are usually connected together by means of a screw type adjuster, as hereinbefore set forth, with the associated disadvantages, or in some cases, they may be connected by pin type connectors, which are also disadvantageous.

SUMMARY OF THE INVENTION

The present invention contemplates a novel slide rod type brake adjusting apparatus particularly designed and constructed for use with locomotive four wheel, single brake shoe trucks, and the like, to overcome the above disadvantages. The novel slack adjuster comprises a cylindrical housing structure or sleeve having one end thereof adapted for connection with a brake lever, or the like. A cylindrical slide rod extends slidably into the housing, and the outer end of the slide bar is adapted for connection with the adjacent brake lever, or the like. As the brake shoes become worn, or when it is necessary to adjust the brake cylinder piston travel for any reason, the slide rod may be quickly and easily pulled or pushed with respect to the outer housing structure, depending upon the type of adjustment required. It will be apparent that the connection of each of the sliding elements of the adjuster precludes mutual rotation therebetween during the respective reciprocal movement. The movement of the slide rod pivots the brake lever or brake levers for repositioning the brake shoe with respect to the outer periphery of the respective wheel. When the brake shoe is properly adjusted, a keeper pin may be inserted through the slide rod housing for securely retaining the slide bar in position and assuring an efficient holding of the brake shoe or brake shoes in the adjusted position thereof. When it is necessary to change or replace the brake shoe, the keeper pin may be removed from the housing and slide rod, and the rod may be quickly and easily pulled through the housing structure in a manner for moving the brake lever or levers sufficiently to pull the brake shoe or shoes away from the wheel to a position wherein access to the brake is readily provided. Upon replacement of the brake shoe, the slide rod may be pushed into or through the housing for moving the brake lever sufficiently for positioning the new brake shoe or shoes in the desired position with respect to the brake cylinder piston travel. The keeper pin may be replaced in the housing and slide rod for efficiently retaining the brake cylinder piston in the proper position, and a spring urged retainer lever may be placed over the keeper pin for retaining the keeper pin in position.

BRIEF DESCRIPTION OF THE DRAWINGS

FIG. 5 is a broken plan view of the outer housing of a brake adjuster embodying the invention and including a keeper pin assembly thereon.

FIG. 6 is a broken side elevational view of a brake adjuster embodying the invention, with portions thereof depicted in section for purposes of illustration.

DESCRIPTION OF THE PREFERRED EMBODIMENT

Figure 1:
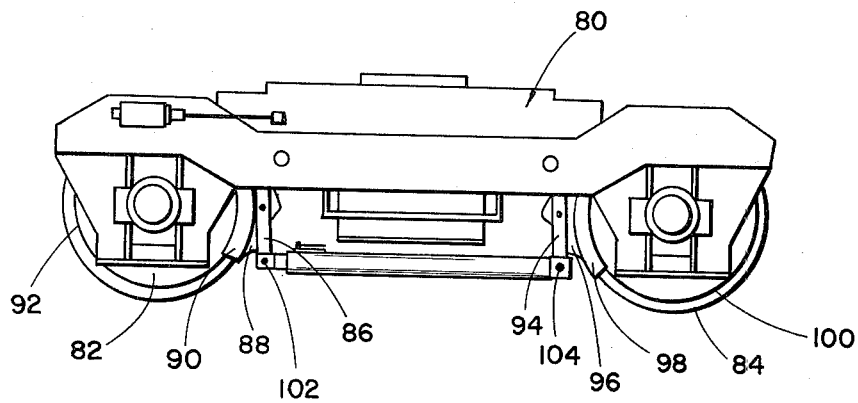
FIG. 1 is a side elevational view of a four wheel single brake shoe locomotive truck provided with a brake adjuster embodying the invention.
Figure 2:
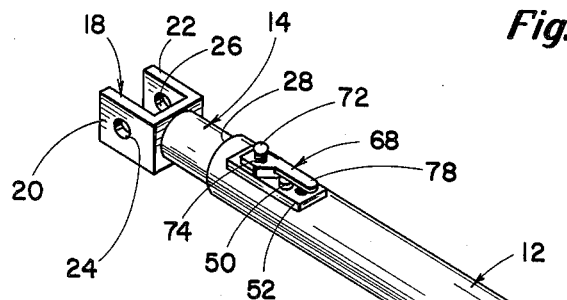
FIG. 2 is a perspective view of a brake adjuster embodying the invention.
Figure 3:
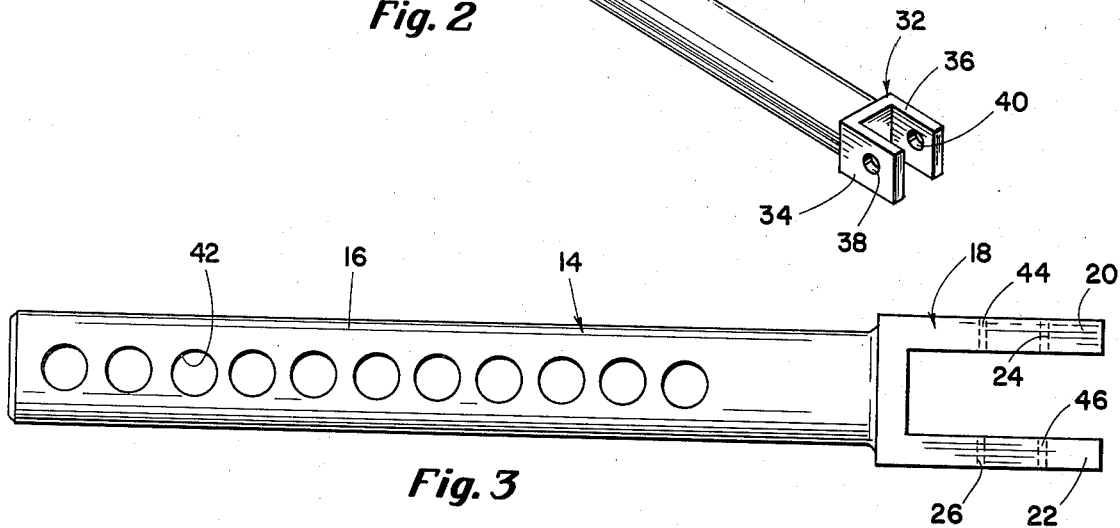
FIG. 3 is a plan view of the slide rod element of a brake adjuster embodying the invention.

Referring to the drawings in detail, reference character 10 generally indicates a brake adjuster apparatus comprising a substantially cylindrical outer housing or sleeve structure 12 having a slide rod apparatus 14 extending slidably therein. The slide rod apparatus 14 comprises an elongated arm member 16 of substantially cylindrical cross-sectional configuration and having the outer diameter thereof slightly less than the inner diameter of the outer housing 12. A yoke-shaped or bifurcated member 18 is welded or otherwise rigidly secured to one end of the rod or arm 16, and is provided with a pair of spaced, substantially flat and mutually parallel flange members 20 and 22 having substantially axially aligned apertures 24 and 26, respectively, provided therein for a purpose as will be hereinafter set forth.

The cylindrical sleeve or housing 12 is open at one end 28 thereof for slidable receiving the rod 16 therein. The opposite end of the housing 12 as shown herein is closed by a suitable plug member 30 (FIG. 6) having a bifurcated or yoke member 32 on the outer end thereof which may be welded or otherwise rigidly secured to the housing 12. The bifurcated member 32 is preferably substantially identical with the yoke 14 and comprises a pair of spaced, substantially flat, mutually parallel flange members 34 and 36 having axially aligned bores 38 and 40, respectively, for a purpose as will be hereinafter set forth. In addition, it is preferable to provide a suitable bushing 39 in each bore 38 and 40. In the assembled relationship between the sleeve 12 and rod element 14, the planes of the flanges 20 and 22 are substantially parallel and in alignment with the planes of the flanges 34 and 36, as will be hereinafter set forth in detail.

A plurality of longitudinally spaced, transversely extending bores 42 are provided in the arm or rod 16, with the spacing therebetween being particularly selected to ultimately provide the desired increments of adjustment for the apparatus 10, as set forth in my aforementioned patents and pending application, and as will be hereinafter set forth. The axes of the bores 42 are substantially mutually parallel, and are substantially perpendicular to the plane of the flanges 20 and 22, and perpendicular to the aligned axes of the bores 24 and 26. In addition, it is preferable to provide suitable bushings 44 and 46 in the bores 24 and 26, respectively, for a purpose as will be hereinafter set forth.

A plurality of complementary pairs of axially aligned bores 48 (FIG. 5) are longitudinally spaced along the sleeve or housing 12 for selective alignment with the bores 42 in a manner and for a purpose as will be hereinafter set forth. The bores 48 are longitudinally spaced in accordance with preselected dimensions related to the spacing between the bores 42 in order to provide the desired increments of adjustment between the relative longitudinal positions of the sleeve 12 and slide rod 16, as set forth in my aforementioned patents and pending application and as will be hereinafter set forth. In addition, the axes of the aligned pairs of bores 48 is substantially parallel to the plane of the flanges 34 and 36, and substantially perpendicular to the axes of the bores 38 and 40.

Figure 4:
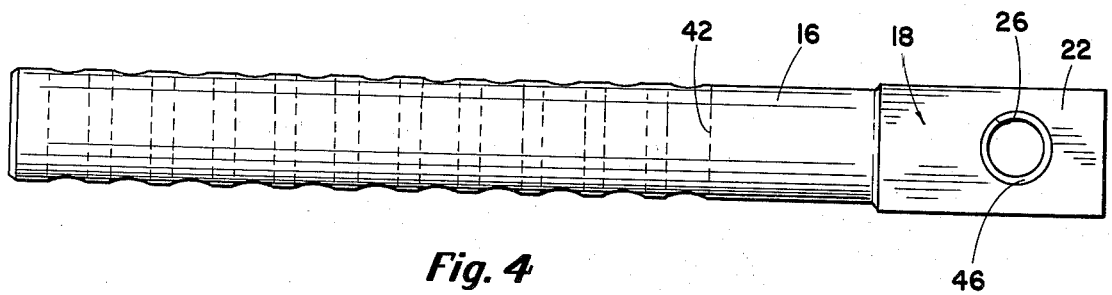
FIG. 4 is a side elevational view of the slide rod shown in FIG. 3.

As shown herein, it is preferable to provide ten of the bores 42 in the slide rod 16, with a spacing of 1 11/32 inches between the centerlines thereof, or eleven of the bores 42 with a spacing of 1 1/32 inches between the centerlines thereof. It is also preferable that each bore be countersunk 1/16 inch on each end thereof, as is particularly shown in FIG. 4. It is also preferable to provide two complementary pairs of bores 48 in the sleeve 12, with a spacing of 2 1/64 inches between the centerlines thereof. However, there is no intention of limiting the invention to any particular number or spacing between the aperatures of either the slide rod 16 or sleeve 12. The aperatures 48 are particularly arranged for selective alignment with selected bores 42 during use of the apparatus 10 whereby a keeper pin may be inserted therethrough for securing the slide bar or rod 16 in a preselected position with respect to the housing or sleeve 12.

A pair of substantially identical apertures plate members 52 and 54 are welded or otherwise secured to the outer periphery of the sleeve 12, and oppositely disposed with respect to each other. The plates 52 and 54 are each provided with a plurality of spaced apertures 56 and 58, respectively, disposed in alignment with the bores or apertures 48 of the sleeve 12. A substantially V-shaped outwardly extending flange 60 is provided on the plate 52 and spaced slightly from the right hand aperture 56, as viewed in FIGS. 5 and 6, and the outer edge thereof is recessed or stair-stepped to provide a centrally disposed groove 62, and a pair of substantially identical intermediate steps 64 on the opposite sides of the groove 62, each step 64 having an outwardly extending shoulder 66 providing stop members for a purpose as will be hereinafter set forth.

A keeper lever 68 is pivotally secured to the plate 56 in the proximity of the flange 60 and on the opposite side thereof with respect to the apertures 46. The lever 68 may be pivotally secured to the plate 52 in any suitable manner, such as by a pivot shaft 70 secured to the plate 52 in any well known manner and having a stop member 72 provided on the outer end thereof. A suitable helical spring 74 is disposed around the shaft 70 and interposed between the lever 68 and the stop member 72 for constantly urging the lever 68 into engagement with the outer surface of the plate 52. The lever 68 may be of any suitable configuration, and as shown herein comprises a main apertured plate portion 76 pivotally disposed around the shaft 70 and having a lever arm 78 extending outwardly and angularly therefrom in a direction generally toward the flange 60 for selective engagement therewith, as will be hereinafter set forth. The spring 75 constantly urges the lever arm 78 against the exposed edge of the flange 60.

When the slide rod 16 is positioned at the desired longitudinal orientation within the sleeve 12, the keeper pin 50 may be inserted through the apertures 48, 56 and 58 which are aligned with one of the apertures 42, as clearly shown in FIGS. 5 and 6, for locking the slide rod 16 within the sleeve 12 until such time as it is necessary to alter the longitudinal orientation therebetween. It is to be noted that the relationship between the planes of the flanges 20, 22 and the axes of the apertures 42, and the relationship between the planes of the flanges 34 and 36 and the axes of the bores 48, 56 and 58 preclude relative rotation between the sleeve 12 and slide bar 16 during operation of the brake adjuster 10 as will be hereinafter set forth.

In order to securely retain the keeper pin 50 in position within the aligned apertures 56, 48 and 42, the keeper lever 68 may be manually pivoted about the pivot shaft 70 by grasping the lever arm 78 and sliding the lever arm 78 along the upper edge of the flange 60 in a direction toward the recess 62. When the arm 78 is positioned in alignment with the recess 62, the force of the spring will urge the arm 78 into the recess whereby the arm 78 will extend across the outer end of the pin 50 and preclude accidental removal of the pin 50 from engagement with the aligned apertures. The spring 74 will function for securely retaining the arm 78 within the recess 62 until such time as it is desired to remove the pin 50 for any reasons. In order to remove the arm 78 from its positioned against the pin 50, the arm 78 may be manually lifted against the force of the spring 74, thus lifting the arm 78 out of the recess 62. The arm 78 may then be disposed against the outer edge of the flange 60 and moved therealong until the arm 78 is away from the recess and disposed in one of the other of the intermediate steps 64. Of course, the stop members 66 substantially preclude a complete disengagement of the arm 78 with the flange 60. When the arm 78 is disposed against one of the intermediate steps 64, the pin 50 is accessible, and may be manually removed from the locking position in the aligned apertures.

Referring now to FIG. 1, a single brake shoe locomotive four wheel truck with which the device 10 may be utilized is generally indicated at 80. The truck 80 as shown herein comprises two pairs of axially aligned wheels 82 and 84 (only one wheel of each pair as shown in the drawings), and the pairs of wheels are in substantial longitudinal alignment whereby the pairs of wheels follow one another as the truck 80 moves along a railway (not shown). A first brake lever 86 has a brakehead 88 and frictional-type brakeshoes 90 pivotally secured thereto intermediate the ends thereof in any suitable manner (not shown), and adapted for intermittent engagement with the cylindrical braking surface 92 of the wheel 82, as is well known. The lever 86 is suitably connected with the usual piston rod (not shown) of the usual braking cylinder (not shown) normally provided for the locomotive truck 80 for actuation of the brakes. The lever 86 is normally carried by the truck 80 in such a manner that movement of the piston rod in one direction will pivot the lever 86 in a direction for moving the brakeshoe 90 into a braking engagement with the wheel-braking surface 92. Conversely, when the piston rod (not shown) moves in an opposite direction, the lever 86 will be actuated for moving the brakeshoe 90 away from or out of engagement with the braking surface 90.

A second brake lever 94 similar to the lever 86 has a second brakehead 96 and frictional-type brakeshoe 98 pivotally secured thereto intermediate the ends thereof in any suitable manner (not shown), and adapted for intermittent engagement with the cylindrical braking surface 100 of the wheel 84, as is well known. The lever 94 is suitably connected with the piston rod (not shown) of the braking cylinder (not shown) normally provided on the locomotive truck 80 for actuation of the brakes. The lever 94 is normally carried by the truck 80 in such a manner that movement of the piston rod in one direction will pivot the lever 94 in a direction for moving the brakeshoe 98 into a braking engagement with the wheel-braking surface 100. Conversely, when the piston rod (not shown) moves in an opposite direction, the lever 94 will be actuated for moving the brakeshoe 98 away from or out of engagement with the braking surface 100.

The device 10 is connected between the lower ends of the levers 86 and 94. As shown in FIG. 1, the brake lever 86 is pivotally secured to the flanges 20 and 22 of the slid rod assembly 14 by a pivot pin 102 secured through the lever 86 and the apertures 24 and 26, and the brake lever 94 is similarly pivotally secured to the flanges 34 and 36 of the sleeve or housing 12 by a pivot pin 104 secured through the lever 94 and the apertures 38 and 40. The devices 10 may thus be utilized in much the same manner as a turnbuckle for adjusting the position of the levers 86 and 94. The slide bar assembly 14 is longitudinally positioned with respect to the sleeve 12 whereby the levers 86 and 94 will be properly positioned to cause the brakeshoes 90 and 98 to efficiently engage the braking surfaces 92 and 100, respectively. This is accomplished by manually moving the slide rod 16 longitudinally with respect to the housing 12 until the proper spacing between the levers 86 and 94 is provided for achieving the desired position of the levers. When the levers 86 and 94 are at the preselected position therefor, the slide bar 16 is positioned in the housing 12 with the aperture 42 in the closest proximity of a set of apertures 48 and in alignment therewith for receiving the keeper pin 50 therethrough. The spacing between the apertures 42 and the spacing between the apertures 48 are selected whereby it is possible to provide adjustment positions between the slide rod 16 and the housing 12 at frequent intervals which as a practical matter is sufficient for brake adjusting devices of this type. When the pin 50 has been inserted through the aligned apertures 42 and 48, the keeper lever 68 is actuated as hereinbefore set forth for engagement with the pin 50 in order to securely retain the pin 50 in position until such time as it becomes necessary to remove the pin for adjustment of the position of the brake levers 86 and 94.

As hereinbefore set forth, relative rotation between the slide rod 16 and the sleeve 12 is precluded by the engagement of the yoke members 18 and 32 with the brake levers 86 and 94, respectively. Thus, the only relative movement between the slide bar assembly 14 and the sleeve or housing 12 will be longitudinal or axial.

When the piston rod (not shown) is actuated by the braking cylinder (not shown) for applying the brakes, as is well known, the levers 86 and 94 are pivoted about the pivot connections 102 and 104, respectively, in directions for simultaneously moving the brakeshoes 90 and 98 against the braking surfaces 92 and 100. When the brakeshoes 90 and 98 have become worn, or it is necessary to adjust the position thereof for any reason for increasing the braking efficiency, the keeper pen 50 may be removed for releasing the slide bar assembly 14 from engagement with the sleeve 12. The slide rod 16 may then be quickly and easily manually moved in the proper direction for adjusting the position of the levers 86 and 94 for providing the desired adjustment therefor. The slide rod 16 may be again secured within the sleeve 12 in the manner as hereinbefore set forth for securing the levers 86 and 94 in the selected position of adjustment.

Figure 7:
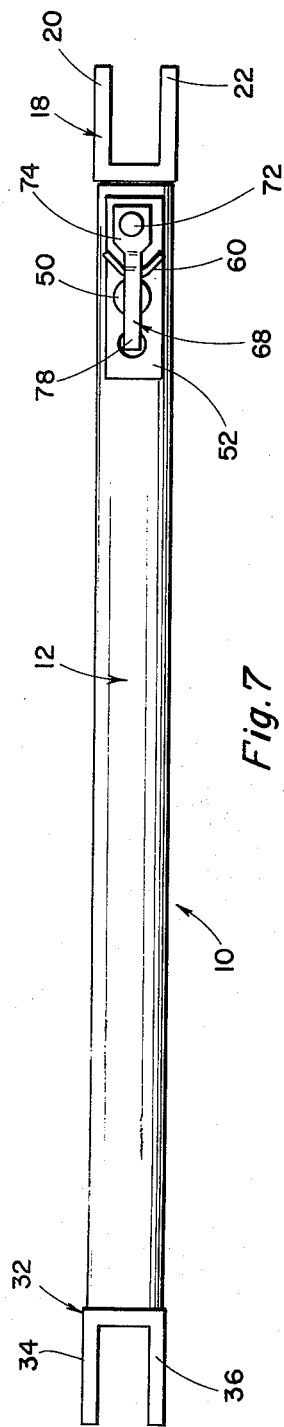
FIG. 7 is a plan view of a brake adjuster embodying the invention depicted in a fully collapsed position therefor.
Figure 8:
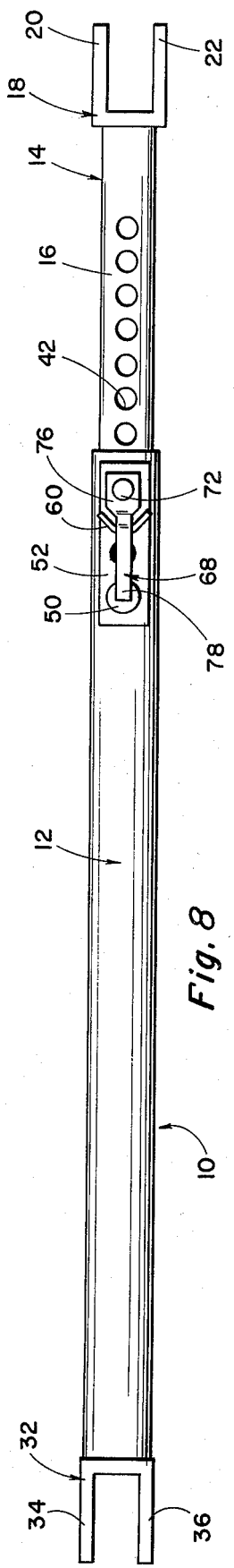
FIG. 8 is a view similar to FIG. 7 depicting an expended position for the adjuster.
Figure 10:
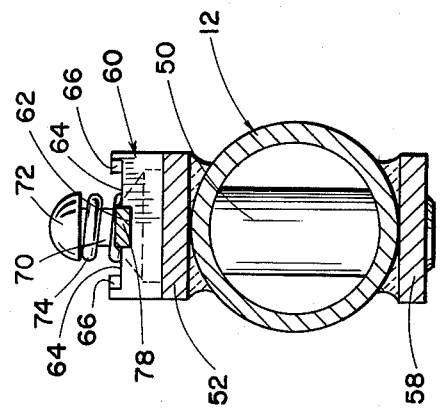
FIG. 10 is a view taken on line 10—10 of FIG. 6.
Figure 9:
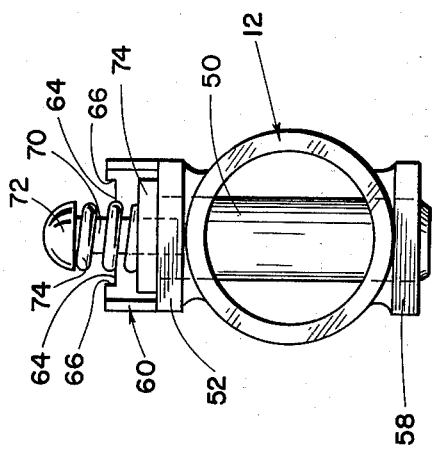
FIG. 9 is a view taken on line 9—9 of FIG. 6.

Referring particularly to FIGS. 7 and 8, it will be apparent that substantially any desired position of adjustment between the levers 108 and 116 may be provided within the practical limits of the usual requirements thereof by the use of the slack adjuster device 10. For example, the pivot connections 102 and 104 of the levers 86 and 94, respectively, may be positioned at the closest proximity to each other by inserting the slide rod assembly 14 fully into the sleeve 12, as shown in FIG. 7. The keeper pin 50 may be inserted through the particular apertures 56, 48, 42 and 58 which may be aligned for maintaining the slide rod assembly 14 securely fastened within the housing or sleeve 12, and the keeper lever 68 may be positioned in such a manner that the arm 78 thereof is disposed adjacent the outer end of the pin 50. In order to adjust the position between the pivot connections 102 and 104 to a greater distance, the pin 50 may be removed, as hereinbefore set forth, and the slide rod assembly 14 may be moved in a right hand direction, as viewed in FIGS. 7 and 8, to an intermediate position within the housing or sleeve 12, or to substantially any desired relative longitudinal disposition with respect thereto. The slide rod assembly 14 may be locked in the sleeve 12 in the manner as hereinbefore set forth. Of course, in order to extend the distance between the pivot connections 102 and 104 to a maximum spacing therebetween, the slide rod assembly 14 may be moved in a right hand direction as viewed in FIGS. 7 and 8 until the left hand bore 42 is in alignment with the right hand apertures 56, 48 and 58, as shown in FIGS. 8, and the keeper pin 50 may be inserted through the aligned apertures for locking the slide rod assembly 14 in position. The keeper lever 68 may be orientated in such a manner that the arm 78 thereof is positioned against the exposed end of the pin 50 for precluding accidental disengagement of the pin from the apertures.

Of course, when it is necessary to completely replace the brakeshoes 90 and 98, the keeper pin 50 may be removed from the apertures, and the slide rod assembly 14 may be pulled or removed from the sleeve 12 to completely disengage the assembly 14 therefrom. The levers 86 and 94 may then be moved for moving the brakeheads 88 and 96 away from the wheels 82 and 84 to provide sufficient clearance for replacing the worn brakeshoes 90 and 98.

From the foregoing it will be apparent that the present invention provides a novel brake adjuster for locomotive brakes of a four wheel single brake type locomotive truck wherein the brakes may be quickly and easily adjusted by manual reciprocation of a slide rod assembly with respect to a sleeve member, each of which have at least one end operably connected with independent brake levers. The brake adjuster functions in much the same manner as a turnbuckle, but through a sliding operation. The novel slack adjuster comprises a slide rod assembly telescopically arranged with respect to a sleeve member and having means cooperating therebetween for securing the slide rod within the sleeve at selected relative longitudinal positions therebetween. The sleeve and rod member are each provided with yoke members on one end thereof for securing to the respective brake levers, with the yoke members being so arranged with respect to the securing means of the sleeve and rod members to preclude relative rotation therebetween, and permit only telescopic movement of the slide rod assembly with respect to the sleeve. The novel slack adjuster is simple and efficient in operation and economical and durable in construction.

Whereas the present invention has been described in particular relation to the drawings attached hereto, it should be understood that other and further modifications apart from those shown or suggested herein, may be made within the spirit and scope of this invention.

What is claimed:

1. In combination with a locomotive four wheel truck having a brake apparatus including brake levers, a brake adjuster device operably connected with the brake levers and comprising elongated sleeve means, slide rod means extending into the sleeve and freely slidable with respect thereto, means cooperating with the sleeve means and slide rod means for securing the slide rod means at substantially any desired longitudinal position with respect to the sleeve means, yoke means provided on the slide rod means and sleeve means for connecting the device to the brake levers for adjusting the position thereof in accordance with the relative longitudinal position between the sleeve means and slide rod means, and the plane of the yoke means being selected in relation to the securing means for precluding rotation of the slide rod means and sleeve means about the longitudinal axes thereof.

2. In combination with a locomotive four wheel truck, a brake adjuster device as set forth in claim 1 wherein the sleeve means comprises a substantially cylindrical elongated sleeve member having one end thereof open for receiving the slide rod means therein and the opposite end thereof closed, one of said yoke means being secured to said closed end and being provided with aperture means for facilitating securing of the sleeve means to the respective brake lever.

3. In combination with a locomotive four wheel truck, a brake adjuster device as set forth in claims 2 wherein the slide rod means comprises an elongated slide rod member having a substantially circular cross-sectional configuration complementary to the cross-sectional configuration of the inner periphery of the elongated sleeve member, the other of said yoke means being secured on one end of the slide rod member and being provided with apertures for facilitating securing of the slide rod means to the respective brakelever.

4. In combination with a locomotive four wheel truck having a brake apparatus including brake levers, a brake adjuster device operably connected with the brake levers and comprising elongated sleeve means, slide rod means extending into the sleeve, means cooperating with the sleeve means and slide rod means for securing the slide rod means at substantially any desired longitudinal position with respect to the sleeve means, yoke means provided on the slide rod means and sleeve means for connecting the device to the brake levers for adjusting the position thereof in accordance with the relative longitudinal position between the sleeve means and slide rods means and for precluding rotation of the slide rod means and sleeve means about the longitudinal axes thereof, said slide rod means comprising an elongated slide rod member having a substantially circular cross-sectional configuration complementary to the cross-sectional configuration of the inner periphery of the elongated sleeve member, the other of said yoke means being secured on one end of the slide rod member and being provided with apertures for facilitating securing of the slide rod means to the respective brake lever, the means for securing the slide rod means to the sleeve means comprising first aperture means provided in the sleeve member, second aperture means being provided in the slide rod member and adapted for selective alignment with the first apertured means, keeper pin means engagable with the aligned apertured means for securing the slide rod member in a preselected position with the sleeve member, and keeper lever means carried by the sleeve means and selectively engagable with the keeper pin means for retaining the pin within the aligned apertures.

5. In combination with a locomotive four wheel truck, a brake adjuster device as set forth in claim 4 wherein the keeper lever means comprises a pair of oppositely disposed plate members secured to the outer periphery of the sleeve member in the proximity of the aperture means thereof and having apertures means in alignment with the aperture means of the sleeve member, outwardly extending flange means secured to one of said plate members and having a plurality of stepped recesses provided on the exposed edge thereof, spring urged lever means pivotally secured to said one plate member and selectively engagable with the stepped recesses of the flange means for selective engagement and disengagement with the keeper pin.

6. In combination with a locomotive four wheel truck having a brake apparatus including brake levers, a brake adjuster device operably connected with corresponding pair of brake levers and comprising an elongated sleeve means connected with one of said pair of brake levers, a slide rod assembly connected with the other of said corresponding pair of brake levers and reciprocally extending into said sleeve means, said sleeve means comprising an elongated substantially cylindrical sleeve having one end thereof open for receiving the slide rod means therein and the opposite end thereof closed, a yoke member secured to the closed end of said sleeve member, said yoke member being provided with aperture means for facilitating securing of the sleeve means to the respective brake lever, said sleeve member being provided with a plurality of longitudinally spaced axially aligned apertures in the side walls thereof and having the axes thereof substantially perpendicular to the axes of the aperture means of the yoke member, said slide rod means comprising a slide rod member having a substantially circular cross-sectional configuration complementary to the cross-sectional configuration of the inner periphery of the sleeve member, a second yoke member secured to one end of the slide rod member and having aperture means for facilitating securing of the slide rod means to the respective brake lever, said slide rod member being provided with a plurality of longitudinally spaced diametrically extending bores having the axes thereof substantially perpendicular to the axes of the apertures means of the second yoke member, the bores of the slide rod member being selectively alignable with the apertures of the sleeve member upon relative longitudinal adjustment between the sleeve means and slide rod means, keeper pin means engagable with the aligned apertures and bores for securing the sleeve means and slide rod means in the preselected longitudinal position therebetween, and lever means selectively engagable with the keeper pin means for precluding accidental dislodging of the keeper pin means during operation of the brake adjuster device, said yoke members cooperating with said slide rod bores and sleeve member apertures for precluding rotation of the slide rod and sleeve about their longitudinal axes.

* * * * *